(12) United States Patent
Gomes et al.

(10) Patent No.: US 10,916,248 B2
(45) Date of Patent: Feb. 9, 2021

(54) WAKE-UP WORD DETECTION

(71) Applicant: BOSE CORPORATION, Framingham, MA (US)

(72) Inventors: Rodrigo Sartorio Gomes, Natick, MA (US); Xiang-Ern Sherwin Yeo, Cincinnati, OH (US)

(73) Assignee: BOSE CORPORATION, Framingham, MA (US)

( * ) Notice: Subject to any disclaimer, the term of this patent is extended or adjusted under 35 U.S.C. 154(b) by 121 days.

(21) Appl. No.: 16/196,175

(22) Filed: Nov. 20, 2018

(65) Prior Publication Data

US 2020/0160858 A1 May 21, 2020

(51) Int. Cl.
| | |
|---|---|
| *G10L 15/22* | (2006.01) |
| *H04R 1/40* | (2006.01) |
| *G10L 25/21* | (2013.01) |
| *G10L 15/08* | (2006.01) |
| *G10L 25/84* | (2013.01) |

(52) U.S. Cl.
CPC .............. *G10L 15/22* (2013.01); *G10L 15/08* (2013.01); *G10L 25/21* (2013.01); *G10L 25/84* (2013.01); *H04R 1/406* (2013.01); *G10L 2015/088* (2013.01); *G10L 2015/223* (2013.01)

(58) Field of Classification Search
CPC ..... G10L 15/063; G10L 15/065; G10L 15/07; G10L 15/22; G10L 15/26; G10L 15/30; G10L 2015/223
USPC ........................................................ 704/233
See application file for complete search history.

(56) References Cited

U.S. PATENT DOCUMENTS

| | | | |
|---|---|---|---|
| 2010/0022283 A1* | 1/2010 | Terlizzi | H04M 1/05 455/570 |
| 2015/0006173 A1* | 1/2015 | Anand | G06F 16/955 704/235 |
| 2017/0310819 A1* | 10/2017 | Fan | H04W 4/14 |
| 2019/0057705 A1* | 2/2019 | Kar | G10L 19/02 |
| 2019/0214002 A1* | 7/2019 | Park | G10L 15/08 |

OTHER PUBLICATIONS

N. Sawhney and C. Schmandt, "Speaking and listening on the run: design for wearable audio computing," Digest of Papers. Second International Symposium on Wearable Computers (Cat. No. 98EX215), Pittsburgh, PA, USA, 1998, pp. 108-115, doi: 10.1109/ISWC.1998. 729536. (Year: 1998).*

* cited by examiner

*Primary Examiner* — Bharatkumar S Shah
(74) *Attorney, Agent, or Firm* — Patterson + Sheridan, LLP

(57) ABSTRACT

Methods and apparatus are provided for improving wake-up word (or trigger word) detection by an audio device. After initially detecting a WUW, an audio device validates the detected WUW using inputs from one or more other systems such as voice activity detection (VAD), on-head detection, or other headphone data. Other headphone data includes inputs received via sensors on the audio device that provide contextual information associated with a state of the user. Based on the inputs from other systems, the audio device is able to identify unintended WUW activations and increase WUW detection accuracy.

21 Claims, 5 Drawing Sheets

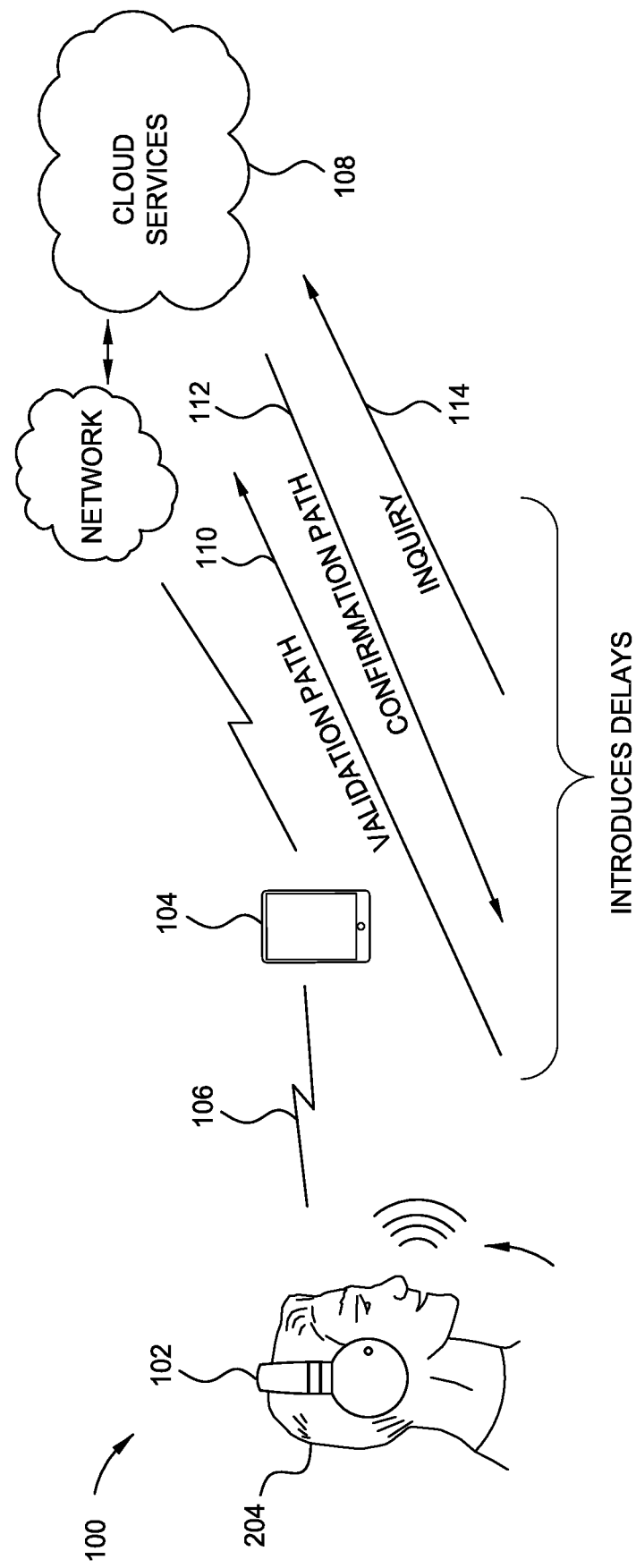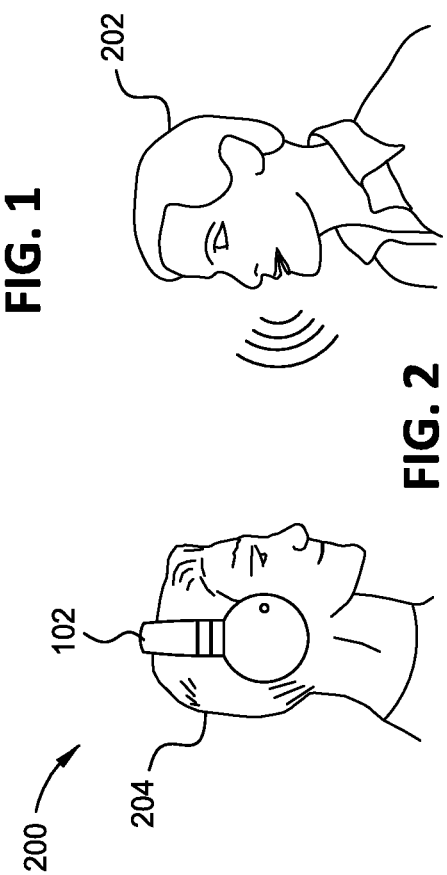
FIG. 1
FIG. 2

WAKE-UP WORD DETECTION

FIELD

Aspects of the disclosure generally relate to improved methods to detect a wake-up word (WUW) by an audio device.

BACKGROUND

Audio devices with voice-controlled user interfaces monitor a sound field for a special cue to activate features. In some examples, the cue is known as a trigger word, a WUW, or hotword. Accurate detection of a WUW enables voice-controlled user interfaces to properly function. For example, accurate detection allows a user to selectively activate features, such as voice-activated control of the audio device. Accordingly, methods for improving the accuracy and speed of WUW detection and validation as well as apparatuses configured to implement these methods are desired.

SUMMARY

All examples and features mentioned herein can be combined in any technically possible manner.

Aspects provide methods and apparatus for improving the accuracy and speed of identifying and validating a WUW by an audio device. As described herein, an audio device combines WUW identification or detection with inputs received from one or more of on-head detection, voice activity detection (VAD), or other sensors. Inputs from WUW detection and any combination of on-head detection, VAD, and other sensors are used to validate a detected WUW. The WUW detection and validation occur at the audio device.

Aspects provide a method for operating a wearable audio device. The method comprises detecting a sound via one or more microphones disposed in the audio device, obtaining additional information relating to the sound, the additional information comprising at least one of information regarding whether a user is wearing the audio device or whether the sound was generated by the user speaking, determining that the sound includes a trigger word, wherein the trigger word is used to invoke at least one operation by the audio device, determining whether the trigger word is valid based at least on the additional information, and taking one or more actions to control one of the wearable audio device or a device external to the wearable audio device when the trigger word is valid.

According to aspects, determining whether the detected sound includes a valid trigger word comprises determining, based on the additional information, that the user is wearing the audio device and that the sound was generated by the user speaking. In response, the audio device determines that the trigger word is valid.

According to aspects, the method further comprises determining, based on the additional information, that the user is not wearing the audio device and setting the audio device to a mode of operation in which the audio device is configured to detect the trigger word when the user is not wearing the audio device. According to aspects, the method further comprises detecting a second sound via the one or more microphones and determining the detected second sound includes the valid trigger word.

According to aspects, the method further comprises determining, based on the additional information, that the user is not wearing the audio device and powering down at least one component in the audio device used to detect at least one of the trigger word or whether the sound was generated by the user speaking.

According to aspects, the method further comprises determining, based on the additional information, that the user is wearing the audio device, maintaining in a low power mode, at least one component in the audio device used to detect at least one of the trigger word or whether the sound was generated by the user speaking, detecting a sound energy of the sound exceeds a configured threshold, and powering up the at least one component in response to detecting that the sound energy of the sound exceeds the threshold.

According to aspects, the method further comprises detecting noise in a vicinity of the audio device is below a configurable noise threshold level and in response, powering down at least one of the microphones to save power.

According to aspects, the method further comprises communicating with devices having an ability to detect a trigger word and determining, based on the additional information, whether to transfer responsibilities of determining whether the trigger word is valid to another one of the devices.

According to aspects, the method further comprises determining, based on the additional information, that the user is not wearing the audio device and in response to determining that the user is not wearing the audio device, transferring responsibilities of determining whether the trigger word is valid to one of the devices. According to aspects, the one of the devices comprises a next closest device to the audio device.

According to aspects, the method further comprises determining, based on the additional information that the user is wearing the audio device and in response to determining that the user is wearing the audio device, retaining responsibilities of determining whether the trigger word is valid.

Aspects provide a method for operating a wearable audio device. The method comprises detecting a sound via one or more microphones disposed in the audio device, determining that a user is wearing the audio device, determining that the sound was generated by the user speaking while wearing the audio device, determining that the sound includes a trigger word, wherein the trigger word is used to invoke at least one operation by the audio device, determining that the trigger word is valid based on the determination that the user is wearing the audio device and that the sound was generated by the user speaking while wearing the audio device, and taking one or more actions to control one of the wearable audio device or a device external to the wearable audio device based on the determined valid trigger word.

According to aspects, the method further comprises determining that the user is no longer wearing the audio device, and setting the audio device to a mode of operation in which the audio device is configured to detect the trigger word when the user is not wearing the audio device.

According to aspects, the method further comprises detecting a second sound via the one or more microphones and determining the second detected sound includes the valid trigger word.

According to aspects, the method further comprises determining that the user is no longer wearing the audio device and powering down at least one component in the audio device used to detect at least one of the trigger word or whether the sound was generated by the user speaking.

According to aspects, the method further comprises, when the user is wearing the audio device, maintaining in a low power mode at least one component in the audio device used to detect at least one of the trigger word or whether the sound was generated by the user speaking, detecting a sound energy of the sound exceeds a configured threshold, and powering up the at least one component in response to detecting that the sound energy of the sound exceeds the threshold.

According to aspects, the method further comprises detecting noise in a vicinity of the audio device is below a configurable noise threshold level and in response, powering down at least one of the microphones to save power.

Aspects provide a wearable audio device, comprising a set of microphones, at least one processor, and a memory coupled to the at least one processor. The set of microphones is configured to receive sound. The at least one processor is configured to detect a sound via the set of microphones, obtain additional information relating to the sound, the additional information comprising at least one of information regarding whether a user is wearing the audio device or whether the sound was generated by the user speaking, determine that the sound includes a trigger word, wherein the trigger word is used to invoke at least one operation by the audio device, determine whether the trigger word is valid based at least on the additional information, and take one or more actions to control one of the wearable audio device or a device external to the wearable audio device when the trigger word is valid.

According to aspects, determining whether the detected sound includes a valid trigger word comprises determining, based on the additional information, that the user is wearing the audio device and that the sound was generated by the user speaking. In response, the wearable audio device determines the trigger word is valid.

According to aspects, the at least one processor is further configured to determine, based on the additional information, that the user is not wearing the audio device and set the audio device to a mode of operation in which the audio device is configured to detect the trigger word when the user is not wearing the audio device.

According to aspects, the at least one processor is further configured to detect a second sound via the set of microphones and determine the detected second sound includes the valid trigger word.

According to aspects, the at least one processor is further configured to determine, based on the additional information, that the user is not wearing the audio device and power down at least one component in the audio device used to detect at least one of the trigger word or whether the sound was generated by the user speaking.

According to aspects, the at least one processor is further configured to determine, based on the additional information, that the user is wearing the audio device, maintain in a low power mode, at least one component in the audio device used to detect at least one of the trigger word or whether the sound was generated by the user speaking, detect a sound energy of the sound exceeds a configured threshold, and power up the at least one component in response to detecting that the sound energy of the sound exceeds the threshold.

According to aspects, the at least one processor is further configured to detect noise in a vicinity of the audio device is below a configurable noise threshold level and in response, power down at least one of the microphones to save power.

BRIEF DESCRIPTION OF THE DRAWINGS

FIG. 1 illustrates an example of a two-stage WUW validation.

FIG. 2 illustrates an example of unnecessarily triggering the two stage WUW validation process.

DETAILED DESCRIPTION

Figure 3:
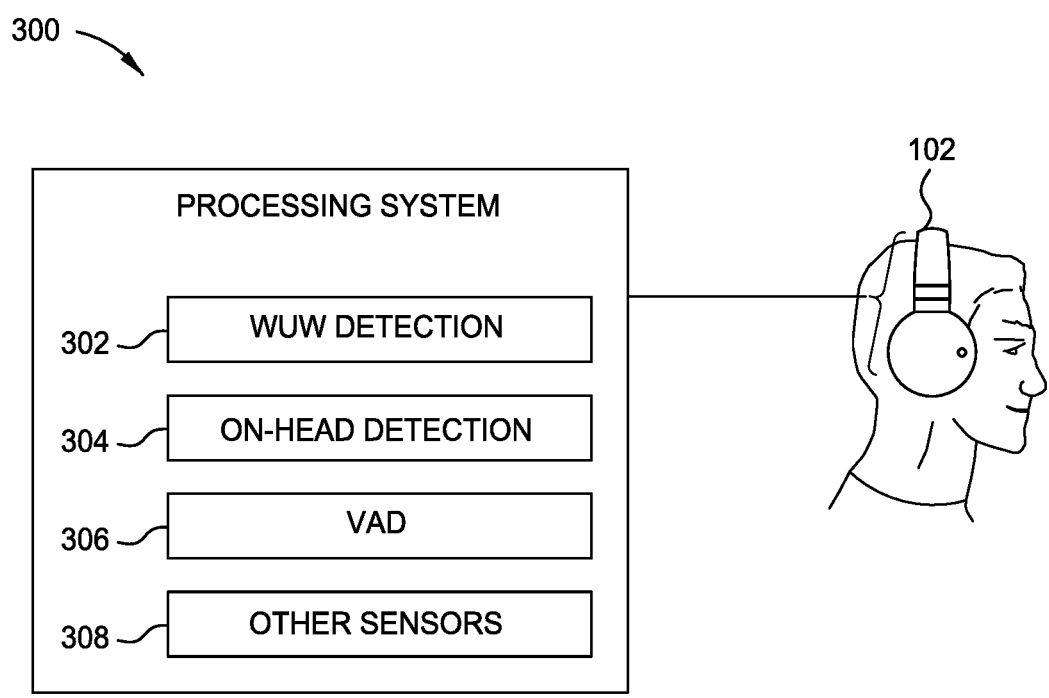
FIG. 3 illustrates an example audio device configured to perform enhanced WUW validation, in accordance with aspects of the present disclosure.

Audio devices with voice-controlled user interfaces listen for a trigger word, which may be referred to as a WUW, to activate features by the audio device or a device in communication with the audio device. Example features include hands-free voice personal assistants (VPAs) and/or voice interface control of the audio device. In some examples, microphones and processors continuously listen for a WUW. The microphones and processors used to detect the WUW consume power. Power consumption can shorten the battery-life of the audio device.

Audio devices need to accurately detect a WUW to function properly and activate a specific voice-controlled user interface when the user speaks a WUW. To provide a desirable user experience, an audio device should avoid false positive WUW detections and false negative WUW detections. A false positive occurs when the audio device mistakenly detects a WUW. In an example, a false positive may occur when somebody other than the user of the audio device speaks the WUW. A false negative occurs when the audio device misses detecting a spoken WUW by a user of the audio device. In an effort to balance power usage and processing consumption at the audio device with accurately detecting a WUW, a two stage WUW validation is currently performed. The two stage validation procedure uses a lower-power first stage validation at the audio device and higher-power second stage validation is performed usually on a secondary mobile device or through cloud-based services when the second stage validation is triggered.

FIG. 1 illustrates an example of a two-stage WUW validation process 100. The two-stage validation process 100 performs a first stage validation at the audio device 102 and a second stage validation at the cloud 108 responsive to the first stage validation identifying a WUW.

A user wears an audio device 102. The audio device 102 includes one or more microphones and one or more processors to monitor for a WUW. The audio device 102 communicates with a wireless device 104 (such as a smartphone) over a wireless connection 106. In an example, the audio device 102 and the wireless device 104 communicate over a Bluetooth connection. In other examples, the audio device 102 and the wireless device 104 communicate using other communication protocols such as, for example, Bluetooth Low Energy (BLE), Near Field Communications (NFC), IEEE 802.11, or other local area network (LAN) or personal area network (PAN) protocols. The wireless device 104 wirelessly communicates with the internet, networks, or hub services such as the cloud 108. While not illustrated, in an example, the audio device 102 directly communicates with the cloud 108.

In an example, a user of the audio device 102 speaks the WUW. The audio device performs a first stage, low-power WUW validation. In an effort to save battery and processing power at the audio device, the first stage validation errs on the side of detecting true positives. Thus, the first stage validation errs on the side of detecting false positives. This helps to minimize false negatives, where the audio device misses the user's spoken WUW. False negatives may lead to a poor user experience, as the audio device does not activate voice-controlled user interfaces and associated features despite the user speaking the WUW.

A second stage WUW validation is performed if the audio device identifies a spoken WUW during the first stage. The second stage validation is more resource intensive than the first stage validation. In an example, the audio device 102 wirelessly signals an indication of an identified WUW to the wireless device 104. The wireless device 104 communicates the information to the cloud 108 and the cloud 108 performs a more robust second stage WUW validation.

The two stage validation process 100 uses resources at the audio device and cloud resources. While the second stage validation is illustrated in FIG. 1 as being performed by the cloud 108, in an example, the second stage validation is performed by the wireless device 104. In an example, the wireless device 104 is a smartphone or a smartwatch. The second stage validation performs more robust algorithms which require higher processing power to confirm a detected WUW. Accordingly, the second stage validation helps to remove false positives detected during the first stage validation process and validate WUWs spoken by the user.

The cloud 108, or entity that performs the second stage validation, transmits a confirmation message 112 when the second stage validates a WUW was generated by the user of the audio device 102. In an example, the confirmation message 112 is wirelessly transmitted to the audio device 102 via the wireless device 104. In an example, the confirmation message is wirelessly transmitted from the cloud 108 to the audio device 102. After receiving the confirmation message 112, the user is prompted to speak a command or inquiry. The user's command or inquiry is sent to the wireless device 104 for local actions or the cloud 108 for cloud-based information or actions.

While the two stage validation process 100 detects a WUW generated by the user, the process creates less than desirable user experiences. The two stage validation process introduces delays in activating voice-controlled user interfaces. In an example, a delay in accessing voice activated features is introduced to accommodate the time needed for second stage validation. According to aspects, the two stage validation process creates disruptions in the audio output of the device. For example, a false positive detected by the first stage pauses the audio output to enable the audio device to receive a command from the user. By the time the second stage validation determines the detected WUW was a false positive, the user has already experienced an unnecessary disruption in audio output.

FIG. 2 illustrates an example of unnecessarily triggering the two-stage WUW validation process 200. In an example, the audio device 102 detects a WUW or a word or phrase similar to the WUW spoken by somebody 202 in the vicinity of the audio device 102 who is not wearing the audio device. Despite the user of the audio device 204 not speaking the WUW, the audio device 102 detects the WUW during the first stage and performs the second stage validation as described with reference to FIG. 1. In the example 200, the user 204 did not intend to activate voice-controlled user interfaces, yet time and resources were spent validating the detected WUW. As a result of the second stage validation, the user 204 may experience a pause in the audio output.

FIG. 3 illustrates an example audio device 102 configured to perform enhanced WUW detection in accordance with aspects of the present disclosure. Enhanced WUW detection includes identifying a WUW from detected sound and validating the identified WUW based on inputs from one or more systems of the audio device.

According to aspects, the audio device 102 is a wearable audio device. The audio device described herein may be referred to as a headset or headphone. The audio device may include in-ear earbuds, over-the-ear headphones, open-ear devices, or a wearable device. Wearable audio devices are configured to be worn on the user's body. In an example, a wearable audio device includes audio eyeglasses, an audio device configured to be worn over the shoulders of the user, or otherwise on the user's body. A headband that covers a portion of the user's head may connect two ear cups of over-the-ear headphones. It should be noted that although specific implementations of wearable audio devices primarily serving the purpose of acoustically outputting audio are presented with some degree of detail, such presentations of specific implementations are intended to facilitate understanding through provisions of examples and should not be taken as limiting either the scope of disclosure or the scope of claim coverage.

The audio device includes one or more microphones to detect sound in the vicinity of the audio device 102. The audio device includes a memory for storing program code for controlling the memory and processor(s)/processing system in accordance with the steps provided herein. The audio device 102 also includes a transceiver that transmits and receives information via one or more antennae to exchange information with one or more other wireless devices. The transceiver is not necessarily a distinct component. The audio device 102 also includes an output transducer also known as a driver or speaker. In some examples, more than one output transducer is used. The transducer converts electrical signals into sound and converts sound into electrical signals.

The processing system or one or more processors are configured to perform WUW detection 302. WUW detection 302 attempts to detect the trigger word or phrase when spoken by a user of the audio device and attempts to reject other phrases and acoustic events including the trigger word or phrase spoken by somebody else in the vicinity of the audio device.

According to aspects, the processor implements at least one signal processing algorithm to detect a WUW in a signal received from the microphone. In an example, in order to accurately detect a WUW in the presence of noise, the processor modifies the signal processing algorithm that is used to detect the WUW if the sound field changes, for example if there is more noise or more people are talking.

One or more signal processing algorithms are used independently or in combination for WUW detection. Beamforming is an example algorithm that uses an array of spaced microphones on the audio device for directional signal reception. Beamforming can be used to better detect a voice in the presence of noise. Other signal processing algorithms include blind source separation and adaptive noise mitigation. Blind source separation involves the separation of a set of signals from a set of mixed signals. Blind source separation typically involves the use of a plurality of spaced microphones to detect the mixed signal, and processing in the frequency domain. Adaptive noise mitigation adaptively removes frequency bands in which noise exists, in order to mitigate the noise signal and thus strengthen the voice signal. Adaptive noise mitigation techniques can be used with a single microphone output, or with the outputs of multiple microphones.

According to aspects, different signal processing techniques can be used to improve WUW detection by the audio device. For example, a simple technique and a single microphone can be used when there is little noise. More complex techniques and a single microphone can be used as WUW detection becomes more difficult, or the same technique but multiple microphones can be used as WUW detection becomes more difficult. The processor may cycle through different signal processing techniques and/or employ more microphones, in order to achieve a desirable level of WUW detection success.

The processing system at the audio device 102 is configured to perform any combination of on-head detection 304 and voice activity detection (VAD) 306.

On-head detection determines if the user is wearing the audio device. Several methods to perform on-head detection are contemplated. In an example, any single method is used in conjunction with other methods to determine the user is wearing the audio device. Based on the form factor, on-head detection determines if the audio device is positioned on the user's ear, in the user's ear, or otherwise on the user's body in a manner in which the device is intended to be used for the user to listen to audio output by the device. Any suitable sensor or on-head detection method may be used for determining if the audio device is positioned in a manner in which the device is intended to be used for the user to listen to audio output by the device.

In an example, the audio device determines on-head detection based on output from infrared sensors that detect the presence of skin. In an example, capacitive sensors detect capacitive coupling when the audio device is near a person's ear or head. In an example, expansion of the headband beyond a certain point indicates the audio device is positioned on the user's head. According to an example, on-head detection is acoustically determined using microphone data or transducer power, wherein the audio device uses a frequency response or current measurement to determine if the audio device is on or off the user's head. In the case of a wearable audio device that includes active noise reduction (ANR) technology, one or more of the feedback and feedforward microphones can be used to determine whether the device is on-head. In an example, on-head detection is mechanically or electrically determined, where on-head placement of the audio device mechanically or electrically completes an otherwise open circuit. In an example, on-head detection is determined based on the output from one or more of an accelerometer, gyroscope, and magnetometer.

VAD determines if the user wearing the audio device is speaking. There are various techniques that can be used to detect that the user wearing the audio device is speaking. According to an aspect, various microphone signals are processed to detect whether a user of the audio device is actively speaking. In an example, the audio device determines a user's voice generally originates at a point symmetric to the left and right sides of the audio device and arrives at both a right front microphone and a left front microphone with substantially the same amplitude at substantially the same time and substantially the same phase. Background noise and vocalizations of other people are asymmetrical between the left and right, having variation in amplitude, phase, and time.

According to aspects, a user's voice originates in a near-field of the headphones and will arrive at a front microphone with more acoustic energy than it will arrive at a rear microphone. Background noise and vocalizations of other people originating farther away may arrive with substantially the same acoustic energy at front and rear microphones. Further, background noise and vocalizations from people that originate farther away than the user's mouth will generally cause acoustic energy received at any of the microphones to be at a particular level, and the acoustic energy level will increase when the user's voice activity is added to these other acoustic signals. Accordingly, the user's voice activity will cause an increase in average acoustic energy at any of the microphones, which may be beneficially used to apply a threshold to VAD.

According to an example, processing system 300 receives inputs from one or more sensors 308 such as an accelerometer, gyroscope, feedback microphone, magnetometer, bone conduction, and heart rate sensor. These sensors determine information associated with the user of the headphone. As an example, the sensors detect head gestures or jaw movement. Output of the sensors is used to help verify detected WUWs.

The WUW detection method described herein combines WUW detection with contextual information provided by any combination of on-head detection, VAD, and other sensors to improve first stage WUW detection accuracy. With improved accuracy during first stage, a separate second stage validation performed external to the audio device is not needed. This improved WUW detection creates a better user experience by minimizing disruptions in the audio output that may be caused by a false positive in the conventional two-stage validation process.

In an example, when a WUW is identified by WUW detection 302 but on-head detection 304 determines that the user is not wearing the audio device 102, the audio device determines the detected WUW is not valid. In another example, when a WUW is identified by WUW detection 302 and VAD 306 determines that the user is not speaking, the audio device 102 determines the detected WUW was not generated by the user talking. Therefore, in both of these cases, the audio device 102 determines that identified WUW is not a valid WUW.

In an example, when a WUW is identified by WUW detection 302 and on-head detection 304 determines that the user is wearing the audio device, the audio device determines the identified WUW is valid. In another example, WUW detection 302 identifies a WUW and VAD 306 determines the user is speaking, the audio device determines the identified WUW is valid.

According to an example, WUW detection is combined with both on-head detection and VAD to determine with an increased confidence the validity of a WUW. Thus, if WUW detection 302 detects a WUW, on-head detection 304 determines the user is wearing the audio device 102, and VAD 306 determines the user is speaking, the audio device identifies the detected WUW as valid. In another example, outputs from one or more sensors are used alone or in combination with on-head detection and VAD to validate a WUW by the audio device. In an example, when sensors detect the presence of skin, a detected WUW may be found to be valid.

Figure 4:
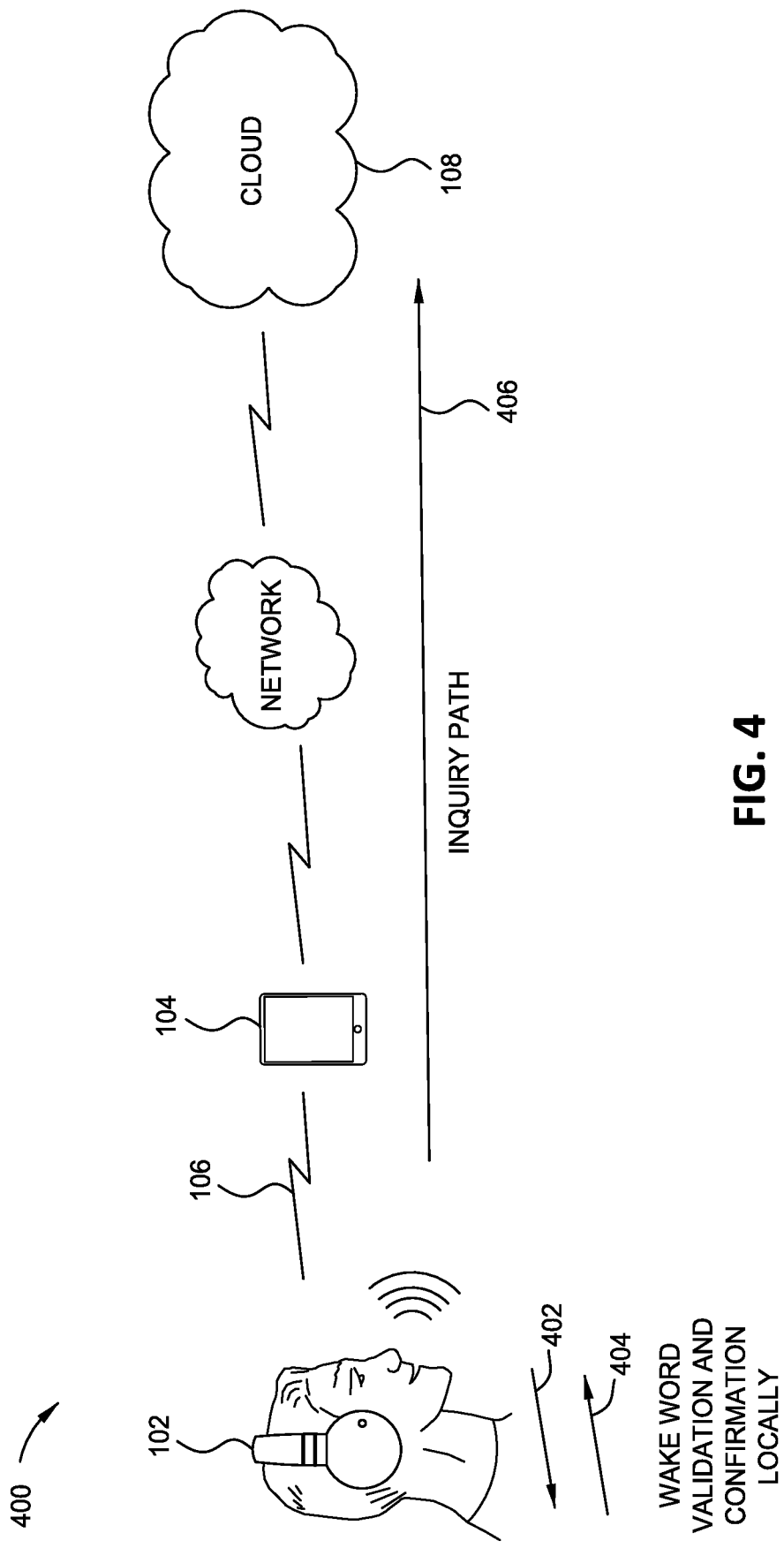
FIG. 4 illustrates an example of enhanced WUW detection, in accordance with aspects of the present disclosure.

FIG. 4 illustrates an example of enhanced WUW detection 400. As described herein, an enhanced validation is performed by the audio device 102, thereby eliminating the need of a separate, external second stage validation.

The audio device identifies a WUW at 402. The audio device uses one or more inputs received from systems of the audio device to validate and confirm the detected WUW at 404. Example systems include on-head detection, VAD, or inputs from other sensors. After confirmation of the spoken WUW the user is able to control the audio device and/or a separate wireless device as shown at 406.

The enhanced validation is more responsive than the two stage validation process illustrated in FIG. 1, because the validation and confirmation steps 404 are performed locally by the audio device 102. The enhanced validation is less susceptible to external triggers such as speech of a nearby person 202 triggering a false positive WUW (as illustrated in FIG. 2). The enhanced validation provides less interruption to audio output previously caused by the two stage validation. When a WUW generated by the user 204 of the audio device is validated and confirmed, the audio device 102 and/or the wireless device 104 may be controlled using voice-activated commands.

Figure 5:
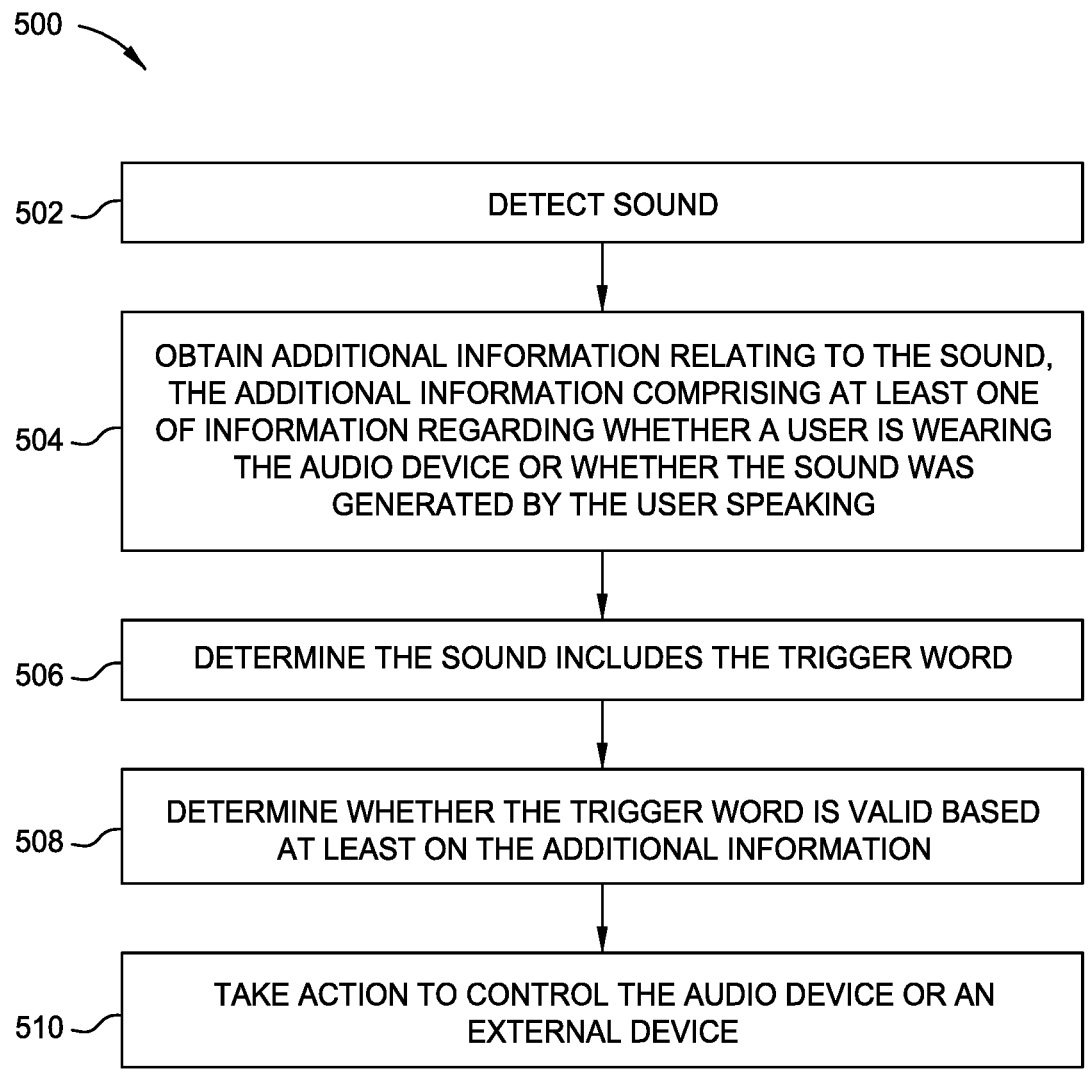
FIG. 5 illustrates example operations performed by an audio device for improved WUW detection.

FIG. 5 illustrates example operations 500 performed by an audio device 102 for improved WUW detection. The operations 500 are performed to determine if the detected sound includes a trigger word, wherein the trigger word is used to activate voice controlled user interfaces, such as voice interfaces used for controlling the audio device and/or a VPA.

At 502, the audio device detects sound via the one or more microphones.

At 504, the audio device obtains additional information related to the detected sound. The additional information includes one or more of information regarding if a user of the audio device is wearing the audio device or if the detected sound was generated by the user speaking.

According to aspects, one or more processors at the audio device perform on-head detection to determine if the audio device is positioned on the user's head. According to aspects, on-head detection determines if the user is wearing the audio device. Output from one or more sensors may be used to determine if the user is wearing the audio device. According to aspects, one or more processors at the audio device perform VAD to determine if the user is speaking. According to aspects, the additional information may include output from one or more sensors. Output from the sensors is used to help validate if the user is speaking and/or if the audio device is on-head. The output from the sensors can be used alone or in combination with one of on-head detection and VAD.

At 506, the audio device determines that the detected sound includes a trigger word, which may be referred to as a WUW. The trigger word is used to invoke at least one operation by the audio device, such as enabling voice-controlled user interfaces for subsequent hands-free control of the audio device or a device in communication with the audio device. According to aspects, one or more processors at the audio device are configured to perform WUW detection by receiving sound detected by the one or more microphones and performing signal processing algorithms to detect a trigger word in the received sound.

At 508, the audio device determines if the detected trigger word is valid based, at least in part, on the additional information related to the detected sound. In an example, the audio device determines that the user is both wearing the audio device and that the sound was generated by the user speaking. Accordingly, the audio device determines that the detected trigger word is valid. In an example, the audio device determines the user the user is wearing the audio device or the user speaking to determine the detected trigger word is valid At 510, the audio device takes one or more actions to control either the audio device or an external device when the trigger word is valid. Examples of controlling the audio device or device external to the audio device include adjusting an overall gain applied to the audio output, enabling hands-free access to a VPA, switching a mode of operation of the audio device to a conversation mode, or changing a song played by the audio device.

Figure 6:
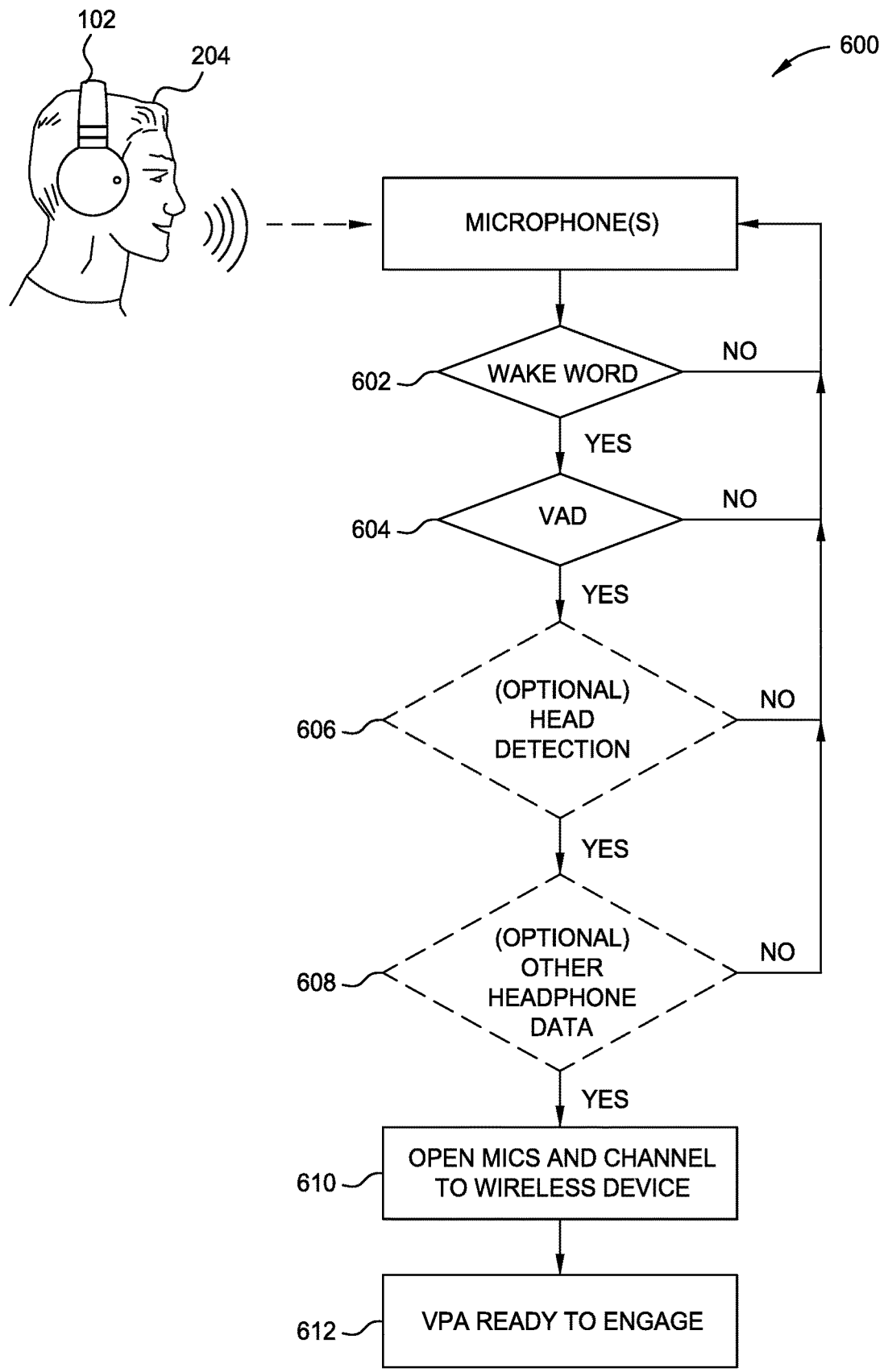
FIG. 6 illustrates an example of improved WUW detection.

FIG. 6 illustrates an example of improved WUW detection 600. At 602, the WUW module 302 receives sound from the microphones. When a WUW is identified, at 604, VAD 306 determines if the user is speaking. If the user is not speaking as determined by VAD, the WUW module 302 continues to monitor for a WUW. In an aspect, if VAD 306 determines that the user is speaking, the audio device validates the detected WUW. At 610, the audio device communicates with a wireless device to activate VPA. At 612, the VPA is ready to receive voice commands from the user.

Optionally, after VAD determines the user is speaking, the process 600, at 606, receives inputs from on-head detection 304 and/or, at 608, receives inputs from other sensors 308. The additional inputs are used to remove unintended WUW activations.

While FIG. 6 illustrates determining a valid WUW after WUW and VAD detection, as explained herein, according to aspects, a valid WUW is identified after WUW detection and any combination of VAD, on-head detection, and inputs from other sensors.

In certain scenarios, it is reasonable to assume that a user does not intend to use voice-activated control when the audio device is determined to be off-head. Accordingly, when the device is determined to be off-head, in an effort to extend the battery life of the audio device, the audio device powers down at least one component used to detect the trigger word such as a microphone or WUW module. In an example, the audio device powers down at least one component used to determine whether the sound was generated by the user speaking, such as VAD. Powering down may include turning off components or entering a low power state. The audio device may turn these components back on or enter a higher power state when the audio device determines it is on-head.

According to aspects, the audio device 102 is part of a multi-device ecosystem. In an example, the audio device communicates with one or more other devices that have the ability to detect a user's WUW. Examples of other devices include a speaker, smartphone, smartwatch, and home security system. When the audio device 102 is determined to be on-head, it assumes WUW detection responsibilities. Other wireless devices in the multi-device ecosystem may ignore WUW triggers or turn off or power down WUW detection features when the audio device is determined to be on-head. When the audio device 102 is determined to be off-head, the audio device 102 transfers WUW responsibilities to another device in the multi-device ecosystem. In an example, the audio device transfers responsibilities by wirelessly transmitting a message to other devices in the multi-device ecosystem that the audio device is determined to be off-head. The other devices in the ecosystem may determine which device assumes the responsibility of WUW detection. In an example, the device nearest the user assumes WUW detection responsibilities. In one example, the audio device is determined to be off-head and a speaker with WUW detection capabilities is the next closest device in communication with the audio device that has WUW detection capabilities. Accordingly, the speaker assumes WUW detection and performs the WUW detection operations described herein.

According to aspects, there may be some instances where the user is not wearing the audio device but would still like to control the audio device or a wireless device. In an example, the audio device is configured with two modes of operation for detecting a WUW. A first mode is used to detect the WUW when the user is wearing the audio device and a second mode is used to detect the WUW when the audio device is not worn by the user. The audio device may use different processing algorithms to detect a WUW spoken by the user based on a determination of if the audio device is on or off head.

As an example, when the audio device is off of the user's head, the WUW spoken by the user may not be received at a point that is generally symmetric to the left and right sides of the audio device. Therefore, when the audio device is on-head, the audio device may operate in a first, near-field WUW detection mode and when the audio device is off head, the audio device may operate in a second, far field-WUW detection mode. Based on the mode of WUW detection, the audio device is configured to detect a valid WUW when the audio device is on and off head. Accordingly, in this example, the user is able to access voice-controlled user interfaces when the audio device is not on the user.

According to an aspect, WUW detection is continuously active in an effort to monitor for a spoken WUW. To save power, when the audio device is determined to be on-head, WUW detection and VAD are active and in low power or power saving mode. When sound energy is detected at a sound level in excess of a configurable threshold amount, WUW and/or VAD may power up or enter a normal power mode.

According to aspects, WUW detection is active and operates in a lower power state when the audio device is determined to be on-head. WUW detection operates in a second, middle power state when the audio device is off-head, operating in a far-field WUW detection mode, and not plugged in to a power source. The audio device operates in a third, higher power performance mode when plugged in to an external power source.

According to an aspect, a reduced set of microphones is used to detect noise in quiet environments. When the detected noise in the vicinity of the audio device is less than a configurable threshold noise level, the audio device powers down one or more microphones to save power. The audio device turns on more microphones as the ambient environment becomes louder and the detected noise exceeds the configurable noise threshold level.

As described herein, WUW detection is performed locally at an audio device. Once a WUW is detected, inputs from at least one of on-head detection, VAD, or other sensors are used to validate the WUW. The inputs increase WUW detection accuracy and therefore eliminate the need for a second stage validation performed by a cloud or a secondary wireless device such as a smartphone or smartwatch.

In the preceding, reference is made to aspects presented in this disclosure. However, the scope of the present disclosure is not limited to specific described aspects. Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams may represent a module, segment or portion of code, which comprises one or more executable instructions for implementing the specified logical function(s). In some implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The invention claimed is:

1. A method for operating a wearable audio device, comprising:
    detecting a sound via one or more microphones disposed in the wearable audio device;
    obtaining additional information relating to the sound, the additional information comprising information regarding whether a user is wearing the wearable audio device and whether the sound was generated by the user speaking;
    determining, based on the additional information, that the user is wearing the wearable audio device;
    maintaining in a low power mode, at least one component in the wearable audio device used to detect at least one of: a trigger word wherein the trigger word is used to invoke at least one operation by the wearable audio device, or whether the sound was generated by the user speaking;
    detecting a sound energy of the sound exceeds a configured threshold;
    powering up the at least one component in response to detecting that the sound energy of the sound exceeds the threshold;
    determining that the sound includes the trigger word;
    determining whether the trigger word is valid based at least on the additional information; and
    taking one or more actions to control one of the wearable audio device or a device external to the wearable audio device when the trigger word is valid.

2. The method of claim 1, wherein determining whether the detected sound includes a valid trigger word comprises:
    determining, based on the additional information, that the user is wearing the wearable audio device and that the sound was generated by the user speaking; and
    in response, determining that the trigger word is valid.

3. The method of claim 1, further comprising:
    determining, based on the additional information, that the user is not wearing the wearable audio device; and setting the wearable audio device to a mode of operation in which the wearable audio device is configured to detect the trigger word when the user is not wearing the wearable audio device.

4. The method of claim 3, further comprising:
detecting a second sound via the one or more microphones; and
determining the detected second sound includes the valid trigger word.

5. The method of claim 1, further comprising:
determining, based on the additional information, that the user is not wearing the wearable audio device; and
powering down at least one component in the wearable audio device used to detect at least one of the trigger word or whether the sound was generated by the user speaking.

6. The method of claim 1, further comprising:
detecting noise in a vicinity of the wearable audio device is below a configurable noise threshold level; and
in response, powering down at least one of the microphones to save power.

7. The method of claim 1, further comprising:
communicating with devices having an ability to detect a trigger word; and
determining, based on the additional information, whether to transfer responsibilities of determining whether the trigger word is valid to another one of the devices.

8. The method of claim 7, further comprising:
determining, based on the additional information, that the user is not wearing the wearable audio device; and
in response to determining that the user is not wearing the wearable audio device, transferring responsibilities of determining whether the trigger word is valid to one of the devices.

9. The method of claim 8, wherein the one of the devices comprises:
a next closest device to the wearable audio device.

10. The method of claim 7, further comprising:
determining, based on the additional information, that the user is wearing the wearable audio device; and
in response to determining that the user is wearing the wearable audio device, retaining responsibilities of determining whether the trigger word is valid.

11. A method for operating a wearable audio device, comprising:
detecting a sound via one or more microphones disposed in the wearable audio device;
determining that a user is wearing the wearable audio device;
determining that the sound was generated by the user speaking while wearing the wearable audio device;
when the user is wearing the wearable audio device, maintaining in a low power mode at least one component in the wearable audio device used to detect at least one of: a trigger word wherein the trigger word is used to invoke at least one operation by the wearable audio device, or whether the sound was generated by the user speaking;
detecting a sound energy of the sound exceeds a configured threshold;
powering up the at least one component in response to detecting that the sound energy of the sound exceeds the threshold;
determining that the sound includes the trigger word;
determining that the trigger word is valid based on the determination that the user is wearing the wearable audio device and that the sound was generated by the user speaking while wearing the wearable audio device; and
taking one or more actions to control one of the wearable audio device or a device external to the wearable audio device based on the determined valid trigger word.

12. The method of claim 11, further comprising:
determining that the user is no longer wearing the wearable audio device; and
setting the wearable audio device to a mode of operation in which the wearable audio device is configured to detect the trigger word when the user is not wearing the wearable audio device.

13. The method of claim 12, further comprising:
detecting a second sound via the one or more microphones; and
determining the second detected sound includes the valid trigger word.

14. The method of claim 11, further comprising:
determining that the user is no longer wearing the wearable audio device; and
powering down at least one component in the wearable audio device used to detect at least one of the trigger word or whether the sound was generated by the user speaking.

15. The method of claim 11, further comprising:
detecting noise in a vicinity of the wearable audio device is below a configurable noise threshold level; and
in response, powering down at least one of the microphones to save power.

16. A wearable audio device, comprising:
a set of microphones for receiving sound;
at least one processor configured to:
 detect a sound via the set of microphones;
 obtain additional information relating to the sound, the additional information comprising information regarding whether a user is wearing the wearable audio device and whether the sound was generated by the user speaking;
 determine, based on the additional information, that the user is wearing the wearable audio device;
 maintain in a low power mode, at least one component in the wearable audio device used to detect at least one of: trigger word wherein the trigger word is used to invoke at least one operation by the wearable audio device or whether the sound was generated by the user speaking;
 detect a sound energy of the sound exceeds a configured threshold;
 power up the at least one component in response to detecting that the sound energy of the sound exceeds the threshold;
 determine that the sound includes the trigger word;
 determine whether the trigger word is valid based at least on the additional information; and
 take one or more actions to control one of the wearable audio device or a device external to the wearable audio device when the trigger word is valid; and
a memory coupled to the at least one processor.

17. The wearable audio device of claim 16, wherein determining whether the detected sound includes a valid trigger word comprises:
determining, based on the additional information, that the user is wearing the wearable audio device and that the sound was generated by the user speaking; and
in response, determining that the trigger word is valid.

18. The wearable audio device of claim 16, wherein the at least one processor is further configured to:
   determine, based on the additional information, that the user is not wearing the wearable audio device; and
   set the wearable audio device to a mode of operation in which the wearable audio device is configured to detect the trigger word when the user is not wearing the wearable audio device.

19. The wearable audio device of claim 18, wherein the at least one processor is further configured to:
   detect a second sound via the set of microphones; and
   determine the detected second sound includes the valid trigger word.

20. The wearable audio device of claim 16, wherein the at least one processor is further configured to:
   determine, based on the additional information, that the user is not wearing the wearable audio device; and
   power down at least one component in the wearable audio device used to detect at least one of the trigger word or whether the sound was generated by the user speaking.

21. The wearable audio device of claim 16, wherein the at least one processor is further configured to:
   detect noise in a vicinity of the wearable audio device is below a configurable noise threshold level; and
   in response, power down at least one of the microphones to save power.

* * * * *